United States Patent [19]

Rancourt et al.

[11] Patent Number: 4,578,527

[45] Date of Patent: Mar. 25, 1986

[54] ARTICLES HAVING IMPROVED REFLECTANCE SUPPRESSION

[75] Inventors: James D. Rancourt; William T. Beauchamp, both of Santa Rosa, Calif.

[73] Assignee: Optical Coating Laboratory, Inc., Santa Rosa, Calif.

[21] Appl. No.: 552,294

[22] Filed: Nov. 16, 1983

[51] Int. Cl.$^4$ .................. G02B 1/10; H01L 31/04; B64G 1/00

[52] U.S. Cl. ..................... 136/256; 126/417; 126/901; 350/164; 350/166; 350/1.6; 428/432; 428/912.2; 244/158 A

[58] Field of Search ............... 136/256, 257; 428/912.2, 432; 126/901, 417; 350/164–166, 1.1, 1.6; 427/167; 244/158 A

[56] References Cited

U.S. PATENT DOCUMENTS

| | | | |
|---|---|---|---|
| 3,427,089 | 2/1969 | Webb | 350/1 |
| 3,671,286 | 6/1972 | Fischell | 428/332 |
| 3,958,042 | 5/1976 | Katsube et al. | 427/162 |
| 4,260,222 | 4/1981 | Kozawa | 350/164 |
| 4,293,732 | 10/1981 | Rancourt et al. | 136/257 |

*Primary Examiner*—Aaron Weisstuch
*Attorney, Agent, or Firm*—Flehr, Hohbach, Test, Albritton & Herbert

[57] ABSTRACT

Article having improved reflectance suppression comprising a substrate formed of a material having a reststrahlen band and having at least one surface and a coating carried by said one surface. The coating comprises at least one period with each period consisting of a spacer layer and an absorber layer. The spacer layer is formed of a material having a low index of refraction and has an optical thickness ranging from approximately one quarter of a wavelength and less. The spacer layer also has low absorption in the visible region of the spectrum. The absorber layer is formed of a material which has substantial absorption near the reststrahlen band. The absorber layer has a complex index of refraction as a function of wavelength which is relatively close to the index of refraction of the substrate.

19 Claims, 6 Drawing Figures

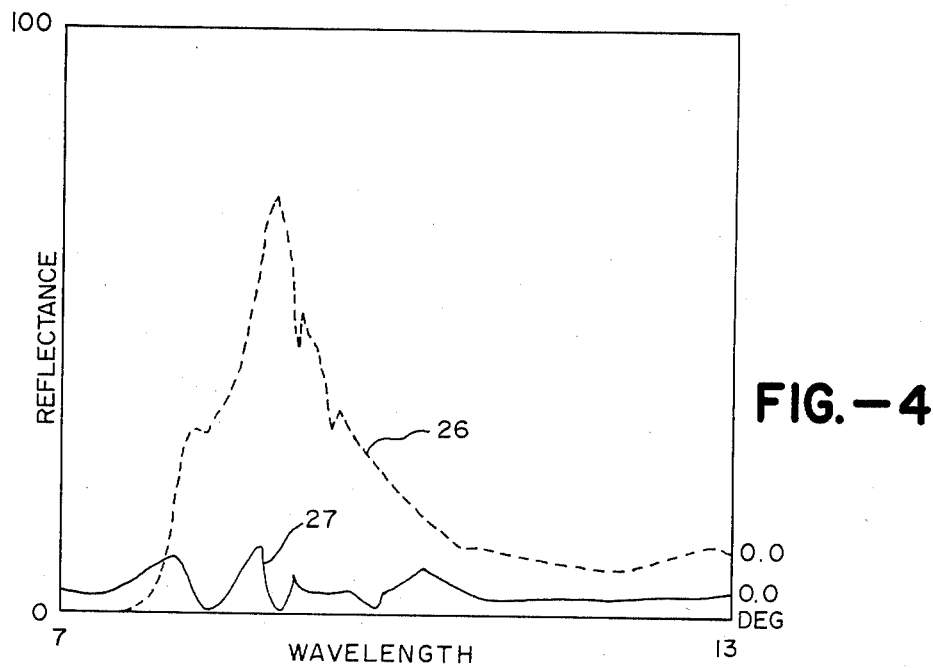
FIG.—4
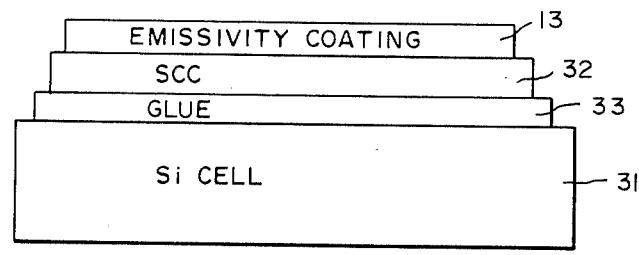
FIG.—5
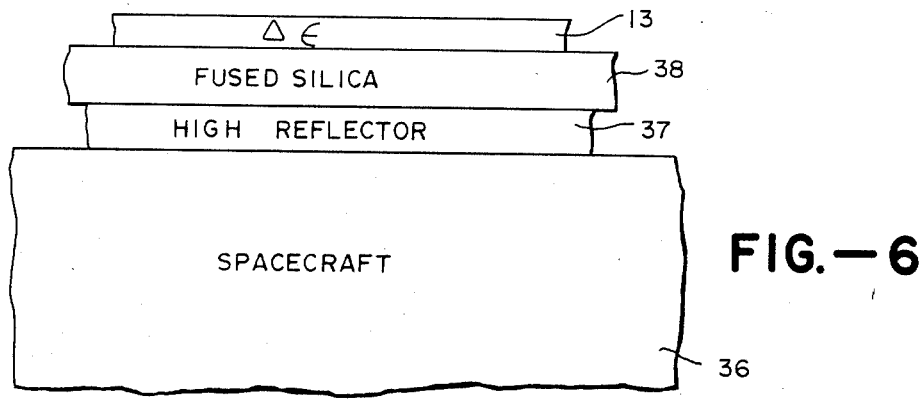
FIG.—6

ARTICLES HAVING IMPROVED REFLECTANCE SUPPRESSION

This invention relates to an article and coating having improved reflectance suppression and enhanced emissivity.

In a number of applications, particularly in space applications, a need has arisen to increase the emissivity in order to overcome overheating problems. There is therefore a need for an article and a coating having enhanced emissivity.

In general, it is an object of the present invention to provide an article and coating having improved reflectance suppression and which has enhanced emissivity.

Another object of the invention is to provide an article and coating of the above character which is particularly applicable to articles formed of a material which has a reststrahlen band.

Another object of the invention is to provide an article and coating of the above character in which the reststrahlen reflectance peak is attenuated.

Another object of the invention is to provide an article and coating which can be utilized for enhancing the emissivity of thermal control mirrors without degrading the performance of those mirrors in the solar portion of the spectrum.

Another object of the invention is to provide an article and coating of the above character which can be utilized on covers of solar cells.

Additional objects and features of the invention will appear from the following description in which the preferred embodiments are set forth in detail in conjunction with the accompanying drawings.

FIG. 4 is a graph showing the reflectance of a six-layer dark mirror.

FIG. 5 is a cross-sectional view showing the article and coating of the present invention being utilized in conjunction with a solar cell.

FIG. 6 is a cross-sectional view showing the manner in which the article and coating of the present invention can be utilized in conjunction with a spacecraft.

Figure 1:
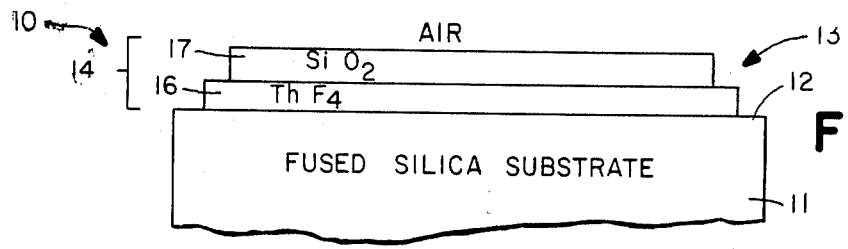
FIG. 1 is a cross-sectional view of an article and a coating having improved reflectance suppression which incorporates the present invention.

In general, the article having improved reflectance suppression is comprised of a substrate formed of a material having a reststrahlen band and at least one surface and a coating carried by the surface. The coating is comprised of at least one period with each period consisting of a spacer layer and an absorber layer. The spacer layer is characterized in that it has low absorption in the visible region and in the ten micron region and is formed of a material having a low index of refraction. It is also relatively water insoluble. The spacer layer is characterized in that it has an optical thickness ranging from approximately a quarterwave and less in thickness. The absorber layer is formed of a material which has a reststrahlen band which is relatively close as a function of wavelength to the reststrahlen band of the substrate.

More particularly as shown in the drawings, the article 10 having improved reflectance suppression consists of a substrate 11. The substrate 11 can be formed of a suitable material exhibiting a reststrahlen band. It is well known that certain materials exhibit reststrahlen bands. For example, fused silica or $SiO_2$ or quartz has such a band. Other materials exhibiting reststrahlen bands are glass, sodium chloride, sapphire, aluminum oxide, beryllium oxide, and other similar materials which can be found from the periodic table.

Fused silica which has been chosen for the substrate 11 in FIG. 1 has an index of refraction of approximately 1.45. The substrate 11 is provided with a planar surface 12 which carries a coating 13 of the present invention. The coating 13 is comprised of at least one period 14 with each period consisting of two layers, one a spacer layer 16, and the other an absorber layer 17. The spacer layer 16 is characterized in that it is formed of a material which has a very low, or, substantially no absorption in the visible and in the wavelength region where energy is to be emitted. In both of these regions, it is desirable that the material have a low index of refraction ranging from 1.2 to 1.5. In addition, it is desirable that this material be relatively water insoluble and have an optimal thickness ranging from approximately one quarter of a wavelength to less than one quarter of a wavelength. One material found to be particularly suitable for a spacer layer is thorium fluoride ($ThF_4$). Thorium fluoride has very desirable characteristics. It has a relatively low stress in systems such as disclosed and is capable of being deposited on relatively thin substrates, as for example, 8 to 10 mils without causing discernable warpage in the substrate.

The use of thorium fluoride as the spacer layer has several advantages. Thorium fluoride is a low index material having good durability. In addition, its index of refraction of approximately 1.50 is an excellent match in the solar region to that of fused silica. For that reason, there is very little interference structure in the solar portion of the spectrum.

Emissivity is related to the absorption of a surface. A black body at a temperature of about 300 K. (approximately 25° C.) has a peak emittance near 10 micrometers. Certain materials, such as fused silica, have reststrahlen reflectance bands in this portion of the spectrum. The high reflectance, and consequently low absorption, leads to low emittance. Reduction of the reflectance in this portion of the spectrum while simultaneously not affecting the optical performance in a remote spectral region, for example in the solar or visible portion of the spectrum, is desirable. If the emitting surface temperature is other than 300 K. so that the peak of the black body curve is at some other wavelength and if there exists a reststrahlen reflectance band at this new wavelength, then the coating of the present invention may be applicable.

The absorber layer 17 is characterized in that is formed of a material which has an index of refraction and a reststrahlen band which as a function of wavelength is relatively close or similar as a function of wavelength to the index of refraction and the reststrahlen band of the substrate 11. Thus with fused silica as a substrate, silicon dioxide can be chosen as the material for the absorber layer 17. It has a reststrahlen band which is substantially identical as a function of wavelength to that of fused silica.

The materials utilized for making the coating 13 can be deposited in a conventional manner. For example, an electron gun can be used to evaporate the silicon dioxide ($SiO_2$) and a resistive source can be utilized for evaporating the thorium fluoride in a vacuum chamber.

It should be appreciated that if desired, other techniques which are well known in the art can be utilized for depositing other materials utilized to incorporate the present invention.

The spacer layer 16 is of an optical thickness so that it spaces the absorber layer 17 approximately one quarter wave and less from the surface 12 of the substrate 11. Thus, the material utilized for this spacer layer 16 must be capable of being coated to approximately one quarter wave and less in the 5 to 13 micron region in addition to being water insoluble so as to provide good durability.

The coating 13 which is shown in FIG. 1 is formed of materials which have substantially the same indices of refraction in the solar portion of the spectrum. Thus, by way of example, the silicon dioxide absorber layer has an index of refraction of 1.45 as does the fused silica layer. The index of refraction of thorium fluoride in the visible region is in the order of 1.5 or slightly less. Thus, it can be seen that the indices of refraction are quite similar. Therefore, visible light passing through the coating 13 would pass through the same as if it were all one material, and therefore there is basically no effect on the visible light.

In the present coating, the radioactivity of the thorium fluoride spacer layer is masked by the silicon dioxide layer which prevents alpha particles from escaping from the thorium fluoride layer. The spacer layer serves to maximize the electric field in the absorber layer so that is absorbs the maximum amount of energy from the incoming electric field.

By utilizing a material for the absorber layer 17 which has a reststrahlen band similar to the reststrahlen band of the substrate 11 and a physical thickness of approximately one quarter of a micron, it is possible to take advantage of the fact that the n & k comprising the complex index of refraction are both quite high in the substrate and the absorber layer, where n is the index of refraction, and k is the absorption coefficient of the material. This provides substantial absorption in the absorber layer. This combination by utilizing a material in the absorber layer which may be the same material or a material which has a very similar reststrahlen band plus the spacer layer 16 provides a low reflectance in the reststrahlen band.

Figure 2:
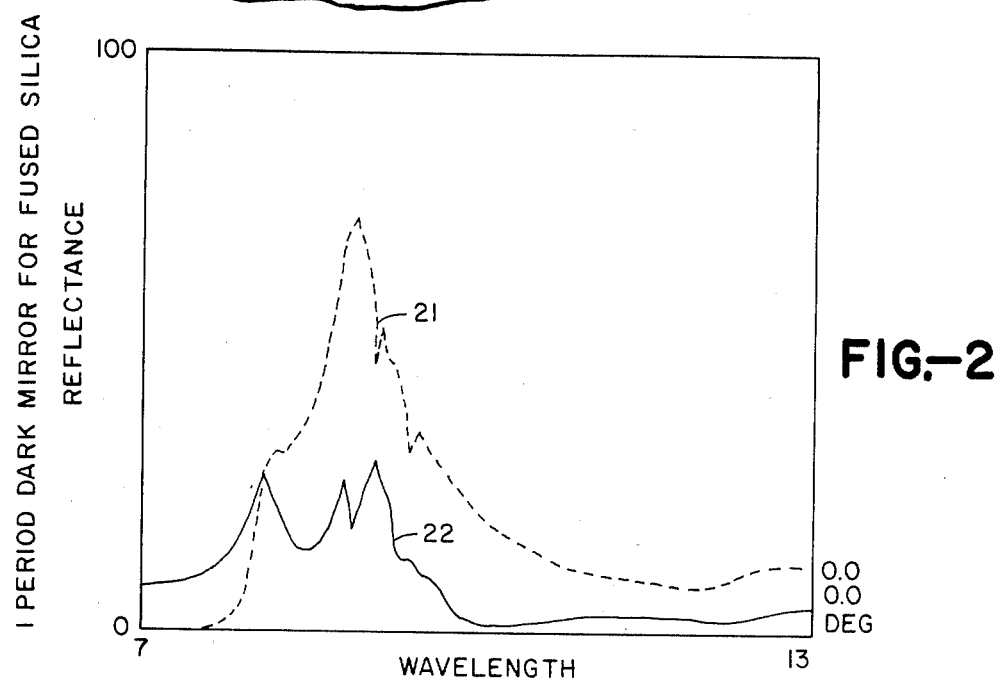
FIG. 2 is a graph showing the reflectance of a dark mirror of the type disclosed in FIG. 1.

This effect can be seen in FIG. 2 in which the broken line 21 shown in FIG. 2, represents the reflectance of bare fused silica and the solid line 22 represents the reflectance with a coating of the type shown in FIG. 1. One design made in accordance with FIG. 1 is set forth below.

| Material | QWOT at 1 Micrometer | Physical Thickness In Micrometers |
|---|---|---|
| Air | | |
| SiO₂ | | 0.237 |
| ThF₄ | 4.96 | 0.886 |
| Substrate | | |

The very substantial reduction in the reststrahlen reflectance peak shown in FIG. 2 has a significant role in enhancing the emissivity of the substrate 11.

The improvement in emissivity can be ascertained. However, a few assumptions must be made because refractive index data is scarce for the region beyond 13 micrometers. This can be significant since 53% of the area under the black body curve is located at wavelengths greater than 13 micrometers. On the other hand, the quarter wave optical thickness (QWOT) of the layers in the coating are less than 10 micrometers, so that interference effects can be expected to be minimal. If it is considered that the total emissivity consists of the sum of the emissivity of individual spectral bands, the following can be stated:

$$\epsilon_{tot} = \frac{\Sigma W_i \epsilon_i}{\Sigma W_i}$$

where $\epsilon_{tot}$ is the integrated emissivity, $\epsilon_i$ is the emissivity (average) in a portion of the spectrum labelled band i, and $W_i$ is a weighting function that consists of the percent of the black body radiation band i.

Since approximately 38% of the black body exitance lies in the 7 to 13 micrometer range, the following equation can be written:

$$\epsilon_{tot} = 0.38\epsilon_1 + 0.62\epsilon_2$$

where $\epsilon_1$ covers the spectral range 7 to 13 micrometers, and, $\epsilon_2$ covers the rest of the spectrum.

The "partial emittance" is defined here as $W_i\epsilon_i$, and since it is assumed that $\epsilon = 1 - R$, the partial emittance in the 7 to 13 micrometer range is $$\epsilon_{7-13} = 0.38(1 - R_{7-13})$$

where $R_{7-13}$ is the 300 K. black body weighted reflectance.

Considering $\epsilon_2$ to be constant, the change in total emittance due to a change in $\epsilon_1$ can be calculated:

$$\Delta\epsilon_{tot} = 0.38\Delta\epsilon_1$$

The curve shown in FIG. 2 shows that the reflectance at 13 micrometers is significantly less that of bare fused silica. Extrapolating this shows that the actual emissivity could be better than the calculated value. At 7 micrometers, the reflectance of the coated surface is higher. However, this is not of great concern since less than 9% of the 300 K. black body exitance occurs at wavelengths shorter than 7 micrometers.

If the single period or a pair of layers does not produce a design with sufficient spectral width, then more periods or pairs can be utilized to widen the design, as hereinafter set forth. Alternatively, an additional layer of the spacer material could be added to the top of the design. This could improve the performance, especially if one of the alternate nonradioactive coating materials was used.

In the design shown below, an additional period 14 was utilized for this purpose consisting of a spacer layer 16 and absorber layer 17. This design is shown below.

| Material | QWOT at 1 Micrometer | Physical Thickness In Micrometers |
|---|---|---|
| Air | | |
| SiO₂ | | 0.149 |
| ThF₄ | 4.946 | 0.883 |
| SiO₂ | | 0.5 |
| ThF₄ | 3.315 | 0.592 |
| Substrate | | |

Again, it can be seen that thorium fluoride was utilized for the spacer layer and that silicon oxide was used for the absorber layer with fused silica as the substrate.

A design utilizing three periods is also shown below utilizing thorium fluoride and silicon oxide with a fused silica substrate.

| Material | QWOT at 1 Micrometer | Physical Thickness In Micrometers |
|---|---|---|
| Air | | |
| SiO$_2$ | | 0.1103 |
| ThF$_4$ | 6.262 | 1.1181 |
| SiO$_2$ | | 0.5 |
| ThF$_4$ | 3.866 | 0.6903 |
| SiO$_2$ | | 0.5 |
| ThF$_4$ | 3.427 | 0.6119 |
| Substrate | | |

Figure 3:
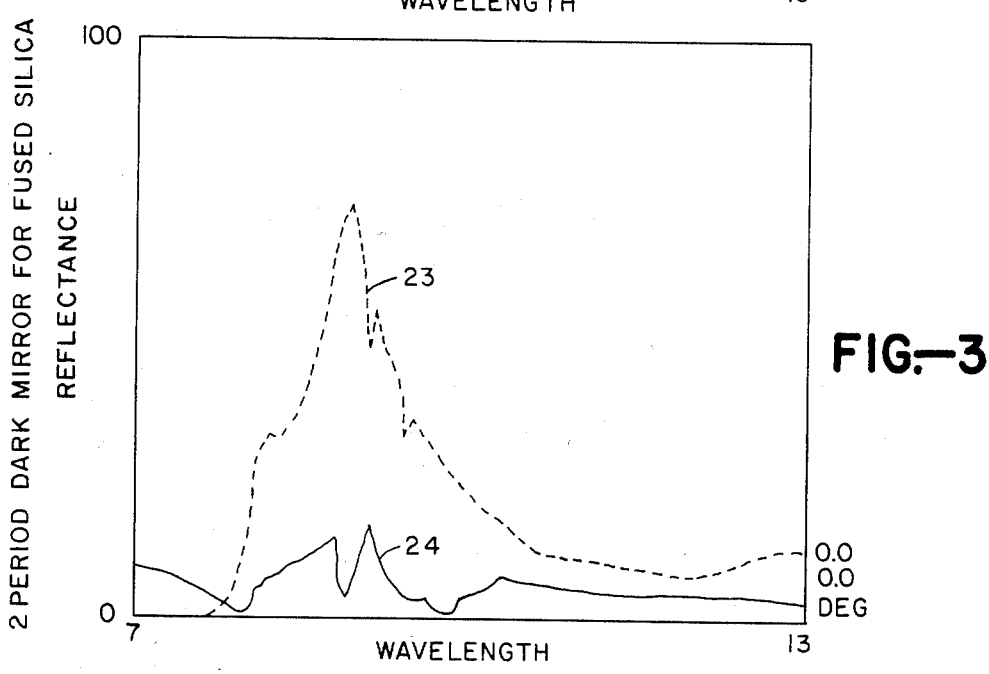
FIG. 3 is a graph showing the reflectance of a four-layer dark mirror.

The curves for these latter two designs utilizing four layers and six layers respectively are shown in FIGS. 3 and 4. In FIG. 3, the broken line 23 represents the reflectance for bare fused silica and solid line 24 represents the reflectance from the four-layer coating. Similarly, in FIG. 4, the broken line 26 represents the reflectance for bare fused silica whereas the solid line 27 represents the reflectance of a six-layer coating.

By comparing the curves in FIGS. 2, 3 and 4 it can be seen that by adding additional periods, further improvement in suppression of the reststrahlen reflectance period is obtained, which from the above analysis would lead to improve emissivity. However, the same general comments made with respect to the solid line curve in FIG. 2 also are generally applicable to the solid line curves shown in FIGS. 3 and 4. As is well known, emissivity is 1 minus reflectance. Therefore, when reflectance is high, the emissivity is low and conversely when the reflectance is low, the emissivity is high. Thus, most energy is emitted when the black body curve is highest and the reflectance is lowest. By reducing reflectance, emissivity is improved to consequently improve the emitted power.

It should be appreciated that the design and technique herein disclosed are applicable to other types of materials pointed out earlier which exhibit reststrahlen bands.

The article and coating of the present invention have a number of applications, particularly in space. Two such examples are shown in FIGS. 5 and 6.

The application shown in FIG. 5 is for use of the emissivity coating 13 on a conventional silicon solar cell. As shown therein, it consists of a silicon solar cell 31 of a conventional type which has secured thereto a solar cell cover 32 by suitable means such as an adhesive 33. The solar cell cover is formed of a conventional material such as fused silica upon which there is deposited the reflectance suppression or emissivity enhancing coating 13 herein before described. The emissivity enhancing coating 13 by suppressing the reststrahlen reflectance improves the emissivity by a substantial percentage. From the curves hereinbefore described in FIGS. 2, 3 and 4, it can be seen that the reststrahlen reflectance has been decreased from a peak of 75% to a peak of below 30%. The important consideration, however, is to examine the area under the respective curves. In this way, it can be seen that the area under the coated article curve is substantially less than that for the uncoated article. Thus by way of example from the coatings shown in the curves in FIGS. 2, 3 and 4, the emittance of the coated articles was calculated from normal incidence reflectance measurements and is expressed in terms of $\epsilon_1$ where $\epsilon_1$ is based on an interval taken from 7 to 13 micrometers. For the two-layer design shown in FIG. 2, $\epsilon_1$ increased by 4%; for the four-layer design shown in FIG. 3, $\epsilon_1$ increased by 5%; and, for the six-layer design shown in FIG. 4, $\epsilon_1$ increased slightly more than 5% to give final emittances of 0.914, 0.918 and 0.918 respectively. By utilizing the emissivity coating in FIG. 5, the average transmission of the cover basically averages out and no penalty is paid in the visible portion of the spectrum and the full electrical output of the solar cell array is obtained.

Another application of the invention is shown in FIG. 6 as a thermal control mirror. To a space craft skin 36 or other applicable surface is attached a high reflector 37 of a conventional type such as enhanced aluminum. The high reflector 37 is formed on the inner surface of a fused silica substrate 38 which is covered with an emissivity coating 13 of the present invention. The emissivity coating 13 is exposed to vacuum or air. The emissivity coating 13 will function in the same manner as disclosed with respect to FIG. 5 in increasing emissivity from the space craft skin 36 while not contributing any substantial absorption in the solar portion of the spectrum or reducing the reflectance in the visible portion of the spectrum.

The thermal control mirror shown in FIG. 6 functions to keep the spacecraft as cool as possible by reflecting visible light from the sun and by having a high emittance well into the infrared. The high reflector reflects visible light from the sun. The normally uncoated fused silica serves to emit heat into space. The emissivity coating 13 enables the surface area of the fused silica to emit roughly 5% more energy than it otherwise would emit without the coating. This makes it possible for 5% less area to radiate this amount of energy as a larger one without the coating.

By use of the present invention the reststrahlen reflectance peak is attenuated thus increasing the 300 K. emissivity. When used in a dark mirror configuration in the 10 micrometer spectral range the dispersion in the complex refractive index of the absorber layer tends to compensate for that of the substrate thus yielding a fairly wide achromatic region. The emissivity of thermal control mirrors is enhanced without degrading the performance in the solar portion of the spectrum. Similarly, the coatings of the present invention are useful for solar cell cover exterior surfaces in those cases where an ultraviolet block is placed on the inside or outside surfaces. The coating is useful with either polished or frosted covers for solar cells.

It is apparent from the foregoing that there has been provided an article and a coating which substantially improves the suppression of reststrahlen reflectance and concomitant with that improve the emittance.

What is claimed is:

1. In an article having improved reflectance suppression, a substrate formed of a material having a reststrahlen band and having at least one surface and a coating carried by said one surface, said coating comprising at least one period with each period consisting of a spacer layer and an absorber layer, said spacer layer being characterized in that it is formed of a material having a low index of refraction and having an optical thickness ranging from approximately one quarter of a wavelength and less, said spacer layer also being characterized in that it has low absorption, said absorber layer being characterized in that it is formed of a material which has a reststrahlen band near the reststrahlen band of the substrate and whose complex index of refraction as a function of wavelength is relatively close to the index of refraction of the substrate, said spacer layer of said period being in contact with the substrate and serving to space the absorber layer from the substrate.

2. An article as in claim 1 wherein said spacer layer has the thickness of approximately one-quarter wavelength and less in the 5–10 micron region.

3. An article as in claim 1 wherein said absorber layer has a thickness of approximately one-quarter of a micron.

4. An article as in claim 1 wherein said spacer layer is formed of thorium fluoride.

5. An article as in claim 4 wherein said absorber layer is formed of a material which arrests the travel of the alpha rays from the thorium fluoride.

6. An article as in claim 1 wherein said substrate is formed of fused silica and wherein said absorber layer is formed of a silicon dioxide.

7. An article as in claim 1 wherein a plurality of periods are utilized.

8. An article as in claim 1 wherein said coating includes an additional overlayer of a low index material.

9. An article as in claim 1 wherein the emittance is increased by at least approximately 4% relative to that of said one surface of the substrate before it is coated.

10. In an article having improved reflectance suppression comprising a substrate which is formed of a material having a reststrahlen band, a spacer layer carried by the substrate and an absorber layer carried by the spacer layer, said spacer layer being characterized in that it is formed of a material which has a low index of refraction, said absorber layer being characterized in that it is formed of a material which has a high absorption coefficient and a complex index of refraction which as a function of wavelength is relatively close to that of the substrate.

11. An article as in claim 10 wherein the spacer layer has a thickness ranging from approximately one-quarter wavelength and less in the 5 to 13 micron region.

12. An article as in claim 10 wherein said absorber layer has a thickness of approximately one-quarter of a micron.

13. An article as in claim 10 wherein said spacer layer is formed of thorium fluoride.

14. An article as in claim 13 wherein said absorber layer is formed of silicon dioxide and wherein the substrate is formed of fused silica.

15. In a solar cell assembly, a solar cell, a solar cell cover covering the solar cell, the solar cell cover being formed of fused silica and an emissivity enhancement coating carried by the solar cell cover, the emissivity enhancement coating being formed of a spacer layer and an absorber layer, the spacer layer being characterized in that it is formed of a material having a low index of refraction and has an optical thickness ranging from approximately one-quarter of a wavelength and less, said absorber layer being characterized in that it is formed of a material which has a complex index of refraction which as a function of wavelength is relatively close to that of fused silica.

16. A solar cell assembly as in claim 15 wherein said spacer layer is formed of thorium fluoride and wherein said absorber layer is formed of silicon dioxide.

17. In a thermal control mirror, a high-reflecting substrate, a layer of fused silica carried by the substrate and an emissivity enhancement coating carried by the fused silica, the emissivity enhancement coating comprising at least one period with each period consisting of a spacer layer and an absorbing layer, said spacer layer being characterized in that it is formed of material having a low index of refraction, said absorber layer being characterized in that it is formed of a material which has a complex index of refraction which as a function of wavelength is relatively close to that of the layer of fused silica.

18. A mirror as in claim 17 wherein the spacer layer formed is thorium fluoride and wherein the absorber layer is formed of silicon dioxide.

19. A mirror as in claim 17 wherein the absorber layer has a thickness of approximately one-quarter of a micron.

* * * * *